United States Patent [19]

McGrath et al.

[11] Patent Number: 5,194,565
[45] Date of Patent: Mar. 16, 1993

[54] POLY(AMIDE-ACID) COMPOSITIONS DERIVED FROM TETRACARBOXYLIC ACID DIANHYRIDES CAPABLE OF SOLUTION IMIDIZATION

[75] Inventors: James E. McGrath, Blacksburg, Va.; Attila Gungor, Göztepe-Istanbul, Turkey

[73] Assignee: Virginia Tech Intellectual Properties, Inc., Blacksburg, Va.

[21] Appl. No.: 735,488

[22] Filed: Jul. 25, 1991

[51] Int. Cl.⁵ ............................................. C08G 79/02
[52] U.S. Cl. .................................... 528/167; 524/27; 525/421; 525/422; 528/125; 528/126; 528/322; 528/342; 528/350; 528/353
[58] Field of Search .................... 525/422, 421, 422; 524/27; 528/322, 342, 350, 353, 125, 126, 167

[56] References Cited

U.S. PATENT DOCUMENTS

| | | | |
|---|---|---|---|
| 3,883,486 | 5/1975 | Bargain | 528/322 |
| 3,929,687 | 12/1975 | Gruffaz et al. | 525/422 |
| 4,005,154 | 1/1977 | Bargain | 524/27 |
| 4,013,600 | 3/1977 | Cassat | 524/27 |
| 4,064,193 | 12/1977 | Bargain | 525/422 |
| 4,837,300 | 6/1989 | St Clair et al. | 528/353 |
| 4,935,490 | 6/1990 | Hayes | 528/353 |

FOREIGN PATENT DOCUMENTS 1030026 10/1963 United Kingdom.

OTHER PUBLICATIONS

Hergenrother et al., in J. Polymer Sci.: Part A: Polymer Chemistry, vol. 27, 1161–1174 (1989).
Summers et al., High Heat Polyimides, Modern Plastics Mar. 1989 pp. 47–52.
Harris et al., ACS Polymer Preprints vol. 17, No. (2) Aug. 1976 pp. 353–358.
A. K. St. Clair et al., Polymers for High Technology ACS Symposium Series 346 (1987).

Primary Examiner—John Kight, III
Assistant Examiner—Shelley Wright
Attorney, Agent, or Firm—Richard P. Fennelly; Louis A. Morris

[57] ABSTRACT

The imidization temperature of poly(amide-acid) compositions derived from tetracarboxylic acid dianhydrides can be lowered by use of a bis(aminophenoxyphenyl) phosphine oxide in the diamine component which is reacted with the dianhydride. These homo- or copolyimides can be cyclized without use of catalysts or excessive temperature which can product undesired side reactions. Tough film forming materials can be produced which show excellent thermo-oxidative stability and high char yields even at 800° C. in air.

4 Claims, No Drawings

POLY(AMIDE-ACID) COMPOSITIONS DERIVED FROM TETRACARBOXYLIC ACID DIANHYRIDES CAPABLE OF SOLUTION IMIDIZATION

BACKGROUND OF THE INVENTION

Conventional poly(amide-acid) compositions derived from tetracarboxylic acid dianhydrides, such as pyromellitic dianhydride (PMDA) are often thermally converted to the desired polyimide compositions at very high temperatures, for example, in the neighborhood of 300° C. While certain "chemical" imidization procedures are known to work at lower temperatures using, for example, acetic anhydride and triethylamine, such procedures also generate undesired isoimide structures. It would be desirable to be able to reduce the temperature of the imidization reaction without using chemical techniques which generate isoimide structures so that, preferably, shaped polyimide products can be formed at milder conditions.

Additionally, U.S. Pat. No. 4,837,300 to T. L. St. Clair et al. describes the need for more processable polyimide compositions and achieves such a result by incorporating the proper mix of flexibilizing units in the backbone of the linear aromatic polyimide compositions it describes. The imidization procedure used in this patent, however, is not described as being significantly lower than conventional especially in the case of tetracarboxylic acid dianhydride-derived poly(amide-acid) compositions such as those derived from PMDA.

F. W. Harris et al. in ACS Polymer Preprints Vol. 17, No. 2 (August 1976), pp. 353–358 review various structure-solubility relationships in aromatic polyimides and lists a variety of diamine-dianhydride combinations which were described in the literature as effective. Two recent reviews which discuss various attempts to achieve soluble aromatic polyimide compositions are: Polymers for High Technology, ACS Symposium Series 346, (1987), "Soluble Aromatic Polyimides for Film and Coating Applications" (Chapter 37) by A. K. St. Clair et al., pp. 437–444 and "High Heat Polyimides Are Easier To Process Now" by J. D. Summers et al., Modern Plastics International, March 1989, pp. 47–52. A recent patent dealing with highly soluble aromatic polyimides is U.S. Pat. No. 4,935,490 to R. A. Hayes.

Hergenrother et al. in J. Polymer Sci:Part A:Polymer Chemistry, Vol. 27, 1161–1174 (1989) discuss polyimides containing carbonyl and ether connecting groups and prepares several new polyimides including one prepared from 3,3', 4,4'-benzophenonetetracarboxylic dianhydride and bis(4-aminophenoxy-4-phenyl)phenyl phosphine oxide. Poly(amide-acid) films were placed on plate glass and were thermally cyclodehydrated, rather than being solution imidized.

British Patent No. 1,030,026 mentions polyamide-acid solutions which can be formed by reacting an aromatic diamine, such as bis[3,5-dimethyl-4-aminophenyl ether (1)]-p,p'-diphenylmethylphosphine oxide (see page 4, lines 1-2) with a tetracarboxylic acid dianhydride, such as pyromellitic acid dianhydride. This reference does not address the effect that a bis(aminophenoxyphenyl) phosphine oxide would have on the solution imidization characteristics or temperature of a tetracarboxylic acid anhydride, such as pyromellitic dianhydride.

SUMMARY OF THE INVENTION

Poly(amide-acid) compositions derived from tetracarboxylic acid dianhydrides that require imidization at relatively high temperatures in the neighborhood of 300° C. or so (such as those derived from PMDA) have been found more easily imidized at significantly lower temperatures (e.g., 150°–200° C.) if the diamine component used to form the poly(amide-acid) composition is a bis(aminophenoxyphenyl) phosphine oxide. Additionally, the resulting polyimide is of a more thermoplastic character resulting in concomitant processability advantages. In the instant process, the solubility of both the poly(amide-acid) and, importantly, the fully cyclized polyimide are maintained. Such materials can be transformed into cast films without the evolution of volatiles, such as water.

DETAILED DESCRIPTION OF THE INVENTION

As is well known in the art, the initial step in the formation of polyimides, in accordance with one currently preferred embodiment thereof, is the reaction of a tetracarboxylic acid dianhydride with an aromatic diamine in a suitable (e.g., polar) solvent to form the poly(amide-acid) also termed "polyamic acid", which is then imidized to the polyimide by thermal means, for example. Two references which relate to such a general procedure are U.S. Pat. Nos. 3,179,614 and 3,179,634 to W. M. Edwards. References describing the thermal means to imidize the poly(amide-acid) are G. M. Bower et al., J. Polym. Sci. Part A 1, 3135 (1963) and L. W. Frost et al., J. Appl. Polym. Sci. 8, 1039 (1969). British Patent No. 1,030,026 generally describes reaction of tetracarboxylic acid dianhydrides with various diamines which can have a plurality of aromatic groups (e.g., 3-5) separated by such groupings as carbon, nitrogen, oxygen, silicon, phosphorus (e.g., phosphine oxide), or sulfur without any indication that such diamines change the imidization conditions to favor milder temperatures. Example 1 in this patent shows use of a varnishing furnace operated at 500° C. to yield the desired polyimide films which are only said to have excellent adhesion to copper, better film elasticity and better dielectric and thermal properties.

The solvent in which the solution imidization possible in accordance with the present invention includes such solvents as N-methylpyrrolidone, N,N-dimethylacetamide, dimethylformamide, dimethylsulfoxide, dichloromethane, phenolic solvents and the like.

The tetracarboxylic acid dianhydrides to which the instant process is particularly applicable can be depicted by the formula

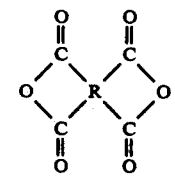

where R is an aromatic group or groups such as phenyl, oxydiphthalic, biphenyl, benzophenone, and diphenylsulfone. PMDA is a preferred dianhydride to utilize.

The diamine component used herein comprises a bis(aminophenoxyphenyl) phosphine oxide of the formula

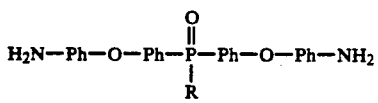

where Ph represents a phenyl group and R represents an alkyl or aryl group. The phenyl/aryl substituents are preferably unsubstituted and the amino substituents ($-NH_2$) are non-para in orientation.

The present invention is further illustrated by the Examples which follow.

EXAMPLE 1

A polyamic acid was prepared at a concentration of 15% solids (w/w) by the slow addition of dianhydrides such as pyromellitic dianhydride (PMDA), symmetrical biphenyl tetracarboxylic dianhydride (s-BPDA), 3,3',4,4'-diphenyl sulfone tetracarboxylic dianhydride (DSPA), 5,5'-[2,2,2-trifluoro-1-(trifluoromethyl)ethyledene]-1,3-isobenzofurandione (6FDA), benzophenone tetracarboxylic dianhydride (BTDA), or 4,4'-oxydiphthalic anhydride (ODPA) to a mechanically stirred solution of bis(3-aminophenoxy-4'-phenyl) phosphine oxide (m-BAPPO) in N-methyl pyrrolidone (NMP) under a nitrogen atmosphere at room temperature. Polymerization solutions were stirred for 6-8 hours. Conversion of the poly(amic acid) intermediate to the fully imidized polyimide was accomplished by a co-solvent system of 80% NMP and 20% cyclohexylpyrrolidone. The reaction was carried out at 160° to 165° C. and was fully cyclized as judged by infrared measurements.

Intrinsic viscosity measurements were performed in NMP at 25° C. using a Canon-Ubbelohde viscometer.

Differential scanning calorimetry (DSC) was used to determine the glass transition temperature (Tg) with a DuPont model 2100 apparatus. Scans were run at 10° C. $min^{-1}$.

Thermal gravimetric analysis (TGA) was performed on the same DuPont apparatus and scans were run at 10° C. $min^{-1}$ in an air or nitrogen atmosphere. In addition to the information described below, these experiments further confirmed that the completely cyclized polyimide had been generated.

INTRINSIC VISCOSITIES AND UPPER GLASS TRANSITION TEMPERATURES OF SOLUTION IMIDIZED m-BAPPO-BASED POLYIMIDE HOMOPOLYMERS

| Polyimide System | Theoretical <Mn> | [n] (dL/g) 25° C., NMP | Tg (DSC) °C. |
|---|---|---|---|
| PMDA/m-BAPPO | 30K | 0.59 | 254 |
| BPDA/m-BAPPO | 30K | 0.46 | 241 |
| ODPA/m-BAPPO | 30K | 0.37 | 220 |
| DSPA/m-BAPPO | 30K | 0.38 | 240 |
| 6FDA/m-BAPPO | 30K | 0.38 | 239 |
| BTDA/m-BAPPO | 30K | 0.43 | 232 |

THERMOGRAVIMETRIC ANALYSIS IN AIR ATMOSPHERE OF m-BAPPO-BASED POLYIMIDE HOMOPOLYMERS

| Polyimide System | Temp of 5% Wt Loss | TMWL* | Yc** % |
|---|---|---|---|
| PMDA/m-BAPPO | 523 | 570 | 18 |
| BPDA/m-BAPPO | 557 | 600 | 35 |
| ODPA/m-BAPPO | 518 | 560 | 12 |
| DSPA/m-BAPPO | 496 | 550 | 12 |
| BTDA/m-BAPPO | 513 | 540 | 10 |
| 6FDA/m-BAPPO | 521 | 560 | >5 |
| KAPTON polyimide | 550 | 600 | — |

*TMWL: Temp of Maximum Wt Loss.
**Yc: Char Yield (%) < at 750° C.
PMDA: Pyromellitic dianhydride.
BPDA: sym-Biphenyl tetracarboxylic acid dianhydride.
ODPA: 4,4'-Oxydiphthalic anhydride.
DSPA: 3,3',4,4'-Diphenylsulfone tetracarboxylic acid dianhydride.
BTDA: benzophenone tetracarboxylic dianhydride.
6FDA: 5,5'-[2,2,2-trifluoro-1-(trifluoromethylethyledene]-1,3-isobenzofurandione.
m-BAPPO: bis(3-aminophenoxy-4'-phenyl) phenyl phosphine oxide.

Listed below are the solubility data for the m-BAPPO based polyimide.

| Polyimide System | NMP | CHCl3 | CB | THF |
|---|---|---|---|---|
| PMDA/m-BAPPO | S | S | I | I |
| BPDA/m-BAPPO | S | S | I | I |
| ODPA/m-BAPPO | S | S | I | I |
| DSPA/m-BAPPO | S | S | I | I |
| BTDA/m-BAPPO | S | S | I | I |
| 6FDA/m-BAPPO | S | S | GELS | S |

Note: S = Soluble; I = Insoluble; CH - Chlorobenzene; NMP - N-methylpyrrolidone; THF - tetrahydrofuran.

Thus, strong, nearly transparent, dense films could be cast from either chloroform, NMP, or from the melt, without evolution of water.

EXAMPLE 2

Listed below are the viscosity and thermal data for various m-Bappo - Oxydianiline (ODA) - PMDA based copolyimides synthesized using the general process shown in Example 1. The imidization was conducted in solution at 160° C. for 24 hours.

INTRINSIC VISCOSITIES AND UPPER GLASS TRANSITION TEMPERATURES OF SOLUTION IMIDIZED m-BAPPO-BASED POLYIMIDE COPOLYMERS

| Polyimide System | Theoretical <Mn> | [n] (dL/g) 25° C., NMP | Tg (DSC) °C. |
|---|---|---|---|
| PMDA/m-BAPPO | 30K | 0.59 | 254 |
| PMDA/90 m-BAPPO 10 ODA | 30K | 0.55 | 265 |
| PMDA/80 m-BAPPO 20 ODA | 30K | 0.49 | 268 |
| PMDA/70 m-BAPPO 30 ODA | 30K | 0.66 | 272 |

THERMOGRAVIMETRIC ANALYSIS IN AIR ATMOSPHERE OF m-BAPPO-BASED POLYIMIDE COPOLYMERS

| Polyimide System | Temp of 5% Wt Loss (°C.) | TMWL* (°C.) | Yc** % |
|---|---|---|---|
| PMDA/m-BAPPO | 523 | 570 | 18 |
| PMDA/90 m-BAPPO 10 ODA | 521 | 570 | 22 |
| PMDA/80 m-BAPPO 20 ODA | 509 | 550 | 13 |
| PMDA/70 m-BAPPO 30 ODA | 511 | 550 | 8 |

*Maximum rate of weight loss.
**Char yield at 800° C.

Thus, the data show that both the homopolymers and the copolmers are not only thermo-oxidatively stable, but also show a very significant (e.g., up to about 35%) char yield at even 800° C. which implies flame retardancy.

EXAMPLE 3

Listed below are the viscosity and thermal data for various m-Bappo - 4,4'-Diamino diphenyl sulfone (p-DDS) - BPDA based copolyimides synthesized using the general process shown in Example 1. The imidization was conducted in solution at 160° C. for 24 hours.

INTRINSIC VISCOSITIES, UPPER GLASS TRANSITION TEMPERATURES AND THERMOGRAVIMETRIC ANALYSIS IN AIR ATMOSPHERE OF SOLUTION IMIDIZED m-BAPPO-BASED POLYIMIDE COPOLYMERS

| Polyimide System | Theoretical $<Mn>$ | $[n]$ (dL/g) 25° C., NMP | Tg °C. | Temp of 5% Wt Loss Air |
|---|---|---|---|---|
| BPDA/m-BAPPO | 30K | 0.46 | 241 | 557 |
| BPDA/90 m-BAPPO 10 DDS | 30K | 0.32 | 247 | 525 |
| BPDA/80 m-BAPPO 20 DDS | 30K | 0.31 | 254 | 520 |
| BPDA/70 m-BAPPO 30 DDS | 30K | — | 258 | 502 |

This Example demonstrates that soluble fully cyclized copolyimides can be generated for the present invention by either using two different dianhydride or diamine components.

EXAMPLE 4

Listed below are the viscosity and thermal data for various m-Bappo - 4,4'-Diamino diphenyl sulfone (p-DDS) - PMDA based copolyimides synthesized using the general process shown in Example 1. The imidization was conducted in solution at 60° C. for 24 hours.

INTRINSIC VISCOSITIES, UPPER GLASS TRANSITION TEMPERATURES AND THERMOGRAVIMETRIC ANALYSIS IN AIR ATMOSPHERE OF SOLUTION IMIDIZED m-BAPPO-BASED POLYIMIDE COPOLYMERS

| Polyimide System | Theoretical $<Mn>$ | $[n]$ (dL/g) 25° C., NMP | Tg °C. | Temp of 5% Wt Loss Air |
|---|---|---|---|---|
| PMDA/m-BAPPO | 30K | 0.59 | 254 | 523 |
| PMDA/90 m-BAPPO 10 DDS | 30K | 0.43 | 267 | 509 |
| PMDA/80 m-BAPPO 20 DDS | 30K | 0.34 | 274 | 495 |

In this Example, two different diamines were utilized with PMDA to produce the desired copolyimides.

The foregoing examples should not be construed in a limiting sense since they are intended to illustrate only certain embodiments of the invention. The scope of protection which is sought is set forth in the claims which follow.

We claim:

1. A poly(amide-acid) composition of lowered imidization temperature which comprises a tetracarboxylic acid dianhydride and an effective amount of a bis-(aminophenoxyphenyl) phosphine oxide for such lowered imidization temperature.

2. A composition as claimed in claim 1 wherein the dianhydride is pyromellitic dianhydride.

3. A composition as claimed in claim 1 wherein the diamine comprises bis(3-aminophenoxy-4'-phenyl) phosphine oxide.

4. A composition as claimed in claim 2 wherein the diamine comprises bis(3-aminophenoxy-4'-phenyl)phosphine oxide.

* * * * *